United States Patent [19]

Makabe et al.

[11] 4,417,188
[45] Nov. 22, 1983

[54] PULSE MOTOR DRIVING SYSTEM

[75] Inventors: Hachiro Makabe, Kanagawa; Haruhiko Tanaka, Mitaka; Akira Orii, Sagamihara, all of Japan

[73] Assignee: Janome Sewing Machine Co. Ltd., Tokyo, Japan

[21] Appl. No.: 311,303

[22] Filed: Oct. 14, 1981

[30] Foreign Application Priority Data

Oct. 16, 1980 [JP] Japan ................................ 55-144706

[51] Int. Cl.³ .............................................. G05B 19/40
[52] U.S. Cl. ..................................... 318/696; 364/400; 112/158 E
[58] Field of Search ............................. 318/685, 696; 112/158 E; 364/400

[56] References Cited

U.S. PATENT DOCUMENTS

| 4,172,990 | 10/1979 | Everett | 318/696 X |
| 4,219,767 | 8/1980 | Wimmer | 318/696 |
| 4,300,085 | 11/1981 | Monma | 318/696 |
| 4,315,472 | 2/1982 | Makabe et al. | 42/158 E |
| 4,377,847 | 3/1983 | Daniel et al. | 364/400 |

Primary Examiner—B. Dobeck
Attorney, Agent, or Firm—Michael J. Striker

[57] ABSTRACT

A driving system for a pulse motor, particularly of a sewing machine, includes an electronic memory for determining the time series of drive pulses to control the speed of the pulse motor according to a number of moving steps. The system is provided with a number of calculating devices operated in accordance with calculating formulas reflecting the functions of the number of stepping pulses to control the stepping speed of the pulse motor in accordance with the number of steps needed by the pulse motor to move a given distance.

1 Claim, 5 Drawing Figures

1. Start   2. Reading of KB
3. Setting of pattern No.
4. Advancing address of ROM
5. Reading of SG
6. SG is high level
7. Flag 0   9. Flag 1
8. 10. $R_1$ = new data − old data
11. $R_1 > 3$
12. $R_1 = 0$
13. $R_2 = 0$
14. $R_3 = 0$
15. $R_4 = R_1$
16. $R_2 = R_1/3 - 1$
17. $R_3 = R_1 - 2(R_2 + 1)$
18. $R_4 = R_2 + 2$
19. $R_5 = R_6 - R_1$
20. ROM2 = address 2
21. End of pattern
23. Other routine   22. INT
24. Completion of one address of ROM1
25. Change of timing signal SG
26. INT
27. Flag 1
28. Driving of $M_B$
29. Driving of $M_F$
30. $R_2 = 0$   31. $R_3 = 0$
32. $R_2 \leftarrow R_2 - 1$
33. Advancing address of ROM2
34. $R_3 \leftarrow R_3 - 1$
35. $R_4 \leftarrow R_4 - 1$
36. $R_5 \leftarrow R_5 + 1$
37. Tracing back of address of ROM2
38. $R_4 = 0$   39. 43. Return
40. Reading data of ROM2
41. A = ROM2 + R5
42. Setting A to timer counter and storing of timer

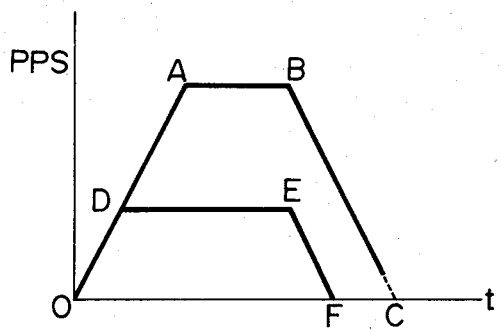
FIG_1
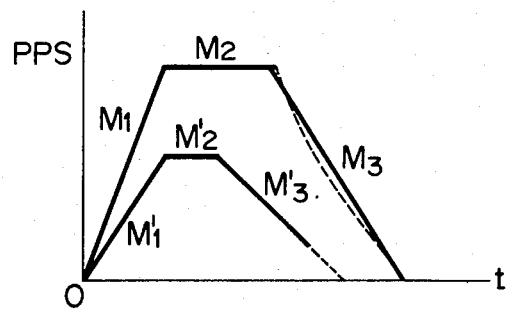
FIG_2
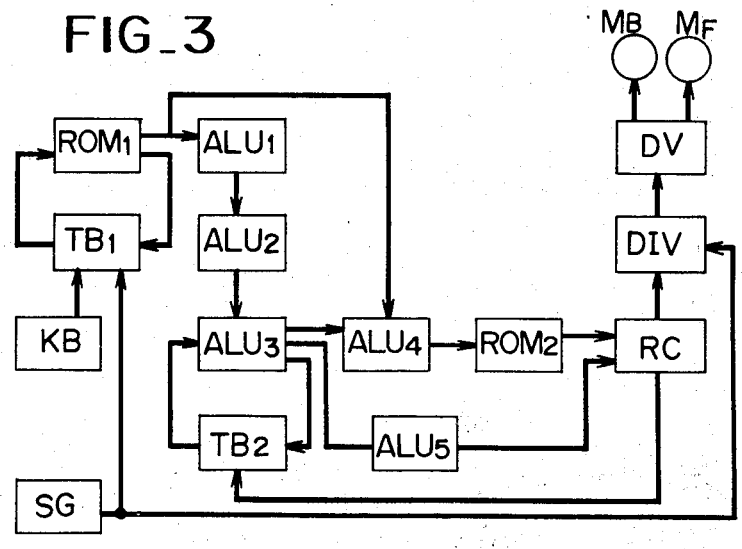
FIG_3

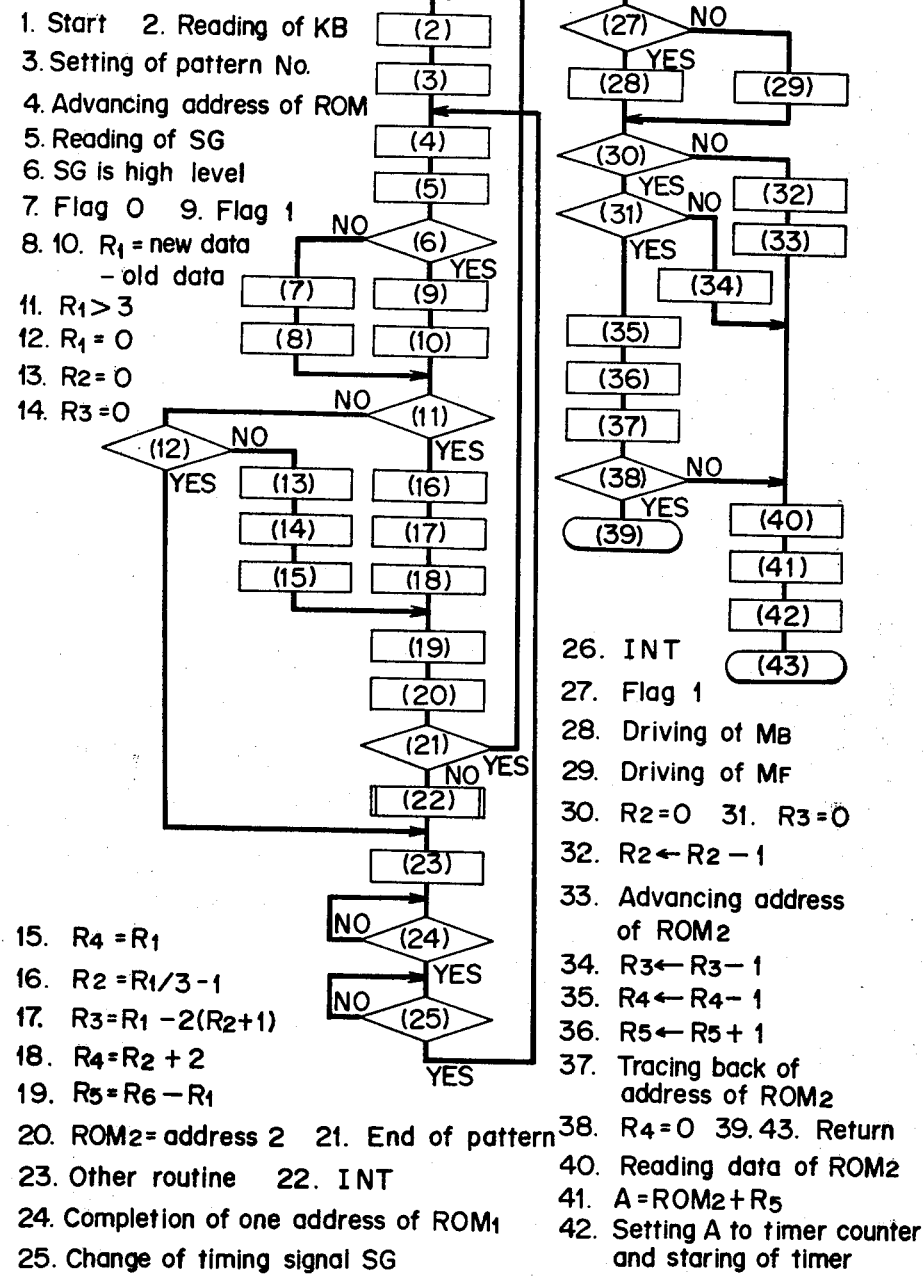

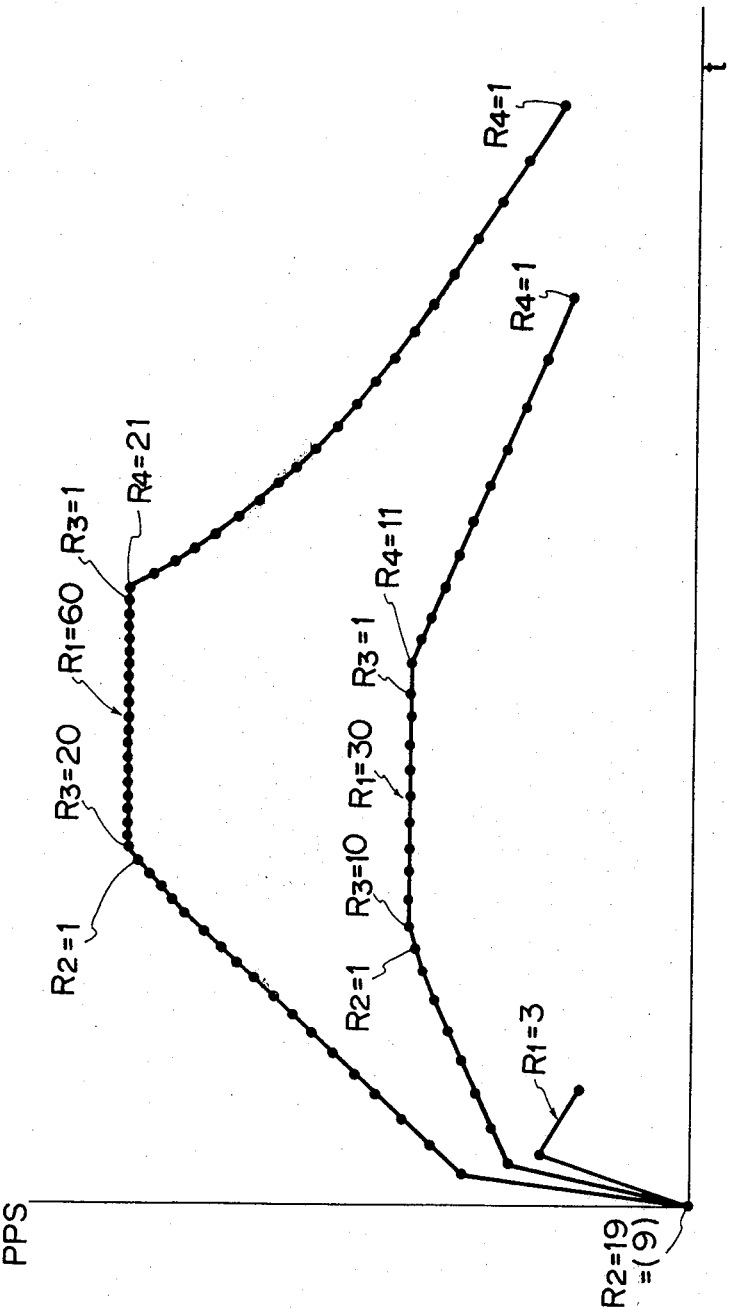
FIG_5

FIG_6

| addresses | data |
|---|---|
| 1 | 179 |
| 2 | 141 |
| 3 | 119 |
| 4 | 104 |
| 5 | 94 |
| 6 | 87 |
| 7 | 81 |
| 8 | 76 |
| 9 | 71 |
| 10 | 68 |
| 11 | 65 |
| 12 | 62 |
| 13 | 60 |
| 14 | 58 |
| 15 | 56 |
| 16 | 54 |
| 17 | 52 |
| 18 | 51 |
| 19 | 50 |
| 20 | 49 |
| 21 | 48 |

PULSE MOTOR DRIVING SYSTEM

BACKGROUND OF THE INVENTION

The invention relates to a pulse motor driving system including a memory storing a minimum amount of control data for determining the time series of drive pulses to control the speed of pulse motor in accordance to a number of moving steps. According to the invention, a limited amount of time series control data is used to calculate out the time series code signals for controlling the stepping speed with a pulse motor in accordance to the number of steps needed by the pulse motor to move a given distance.

Generally a pulse motor has to be driven a given distance with comparatively many steps within a limited interval of time. As the result, vibrations are produced in the accelerating and decelerating directions due to the inertia of the motor and the load thereof. In order to reduce such vibrations, groups of data are stored as the time series codes which are each specific to the sections of different numbers of steps to give suitable pulses to the motor all through the driving sections. These groups of data are selectively designated each time the moving steps of the pulse motor are designated, thereby to control the speed of the motor. It is however a drawback of this method to require a very big data storing capacity.

There is a trapezoidal driving method as a way of minimizing the data storing capacity as is disclosed in detail in the copending U.S. patent application Ser. No. 131 357 or in copending West German patent application No. P 30 11 715.8 of the same applicant. Brief explanation of this is as follows; In reference to FIG. 1, in which the lateral axis shows a time ( t seconds), i.e., the accumulation of time intervals between the adjacent pulses and the vertical axis shows a speed of pulses, i.e., a number of pulses PPS per second, the speed of pulses is increased from a point 0 to a point A with a sufficient acceleration in a section of comparatively many steps, so that the pulse motor may mechanically follow the start, and then a high speed is constantly maintained in the section between the points A and B, and then the speed is decreased as the motor comes to stop in the section between the points B and C so that the motor may properly follow the speed. Thus the number of steps is designated by the drive steps which are determined by the size of trapezoid surrounded by lines O A B C. The shape of trapezoid is determined on a condition that a time interval is comparatively short from start to stop of the motor, the motor properly follows the speeds of pulses, and vibrations will not be produced at the speed changing points A, B, C. The data comprising time series codes of pulses are all stored in an electronic memory which are plotted generally with an uneven space therebetween on the lines O A B C, though with an even space therebetween on the line A B in this case.

These data may be used to control a comparatively small number of moving steps of pulse motor. Namely, in response to a designation of moving steps, a number of steps are accorded with the designation of moving steps by way of a space defined by a line OD on the line OA, a line DE in parallel with the line AB and a line EF in parallel with the line BC, thereby to reduce the stepping time OF in comparison with the time OC as is required. With respect to the number of steps defined by the space surrounded by lines ODEF, the points D, E, F are determined on a condition that the speed of pulses is not excessively low or high as will be described hereunder, and there are used the data between the points O and D, the data between the points D and E, and the data between the points B and C for the section between the points E and F. In this case, the time OF can be shortened by drawing the speed of pulses up to that of line AB.

On the other hand, it becomes necessary to adjust the position of pulse motor so as not to lag behind the pulses especially in the time DE, to thereby reduce the vibrations in the accelerating and decelerating directions. Otherwise the speed of pulse motor comes to be decreased before the vibrations are reduced and as the result, the vibrations and sounds are produced. Further even if the line DE is lowered and is drawn up to the starting frequency of the motor, the time OF is prolonged and the vibrations per step are increased. Such phenomena have been the hindrances in practically reducing the accelerating and decelerating vibrations, especially in a region of small number of steps of pulse motor.

SUMMARY OF THE INVENTION

The present invention has been provided to eliminate such defects and disadvantages of the prior art, and it is a primary object of the invention to provide a system for smoothly driving the pulse motor for example of a sewing machine at a high speed. For attaining this object, the pulse motor driving system comprises a memory storing data for controlling time intervals between the adjacent pulses produced in a series to steppingly drive a pulse motor; means for designating a number of stepping pulses in a section from start to stop of the pulse motor; calculating means dividing the designated number of stepping pulses into a predetermined number of parts, said calculating means controlling the read-out order of the time interval control data in each of the divided parts of pulses, to thereby to repeatedly use the data to control the time intervals between the pulses in these divided parts, said calculating means including calculating formulas in the form of functions of the number of stepping pulses, each being specific to the divided parts of pulses so as to modify the data read out to control the pulses in these divided parts; pulse generating means operated in response to the output data of the calculating means to determine to time intervals of the pulses; said calculating means operated in accordance to the calculating formulas to progressively increasing and decreasing the speed of pulses in the divided parts, said calculating formulas including coefficients to modify the degrees of progesssive increase and decrease of the pulse speed in response to the number of stepping pulses. As a result, as the number of stepping pulses is smaller, the rising and falling inclinations are made milder and also the time required to the stepping travel of the motor is shortened accordingly as shown in FIG. 2. In contrast, as shown in FIG. 1 of the prior art, the rising and falling inclinations are substantially same if the number of stepping pulses is changed.

BRIEF DESCRIPTION OF THE DRAWINGS

FIG. 1 is a diagram of the prior art showing the acceleration and deceleration properties of pulses for driving a pulse motor;

FIG. 2 is a diagram of the invention showing the acceleration and deceleration properties of pulses for driving a pulse motor;

FIG. 3 is a block diagram showing an embodiment of the invention for controlling the pulse motor;

FIG. 4 is a flow chart of the block diagram;

FIG. 5 is a diagram plotted on the basis of the embodiment in relation to FIG. 2; and FIG. 6 is a table showing the addresses and data for controlling the time intervals of pulses in a progressively decreasing direction.

DETAIL DESCRIPTION OF THE INVENTION

In reference to FIG. 3 showing a block diagram for controlling a pulse motor which is used in combination with a sewing machine to control the position of a sewing machine needle, $ROM_1$ is an electronic memory storing stitch control data. KB is a key board including a number of pattern selecting switches selectively operated to produce a pattern signal. SG is a synchronizer operated in a timed relation with rotation of a drive shaft of the sewing machine to produce a synchronizing signal which rises immediately after the needle comes out of a fabric to be sewn and remains high level while the needle is above the fabric, and which falls just before the needle penetrates the fabric and remains low level while the needle is in the fabric. $TB_1$ is a first timing buffer receiving a pattern signal from the key board KB to designate the initial address of the data in the memory $ROM_1$ and to advance the addresses at the rising and falling time of the synchronizing signal, so that the memory $ROM_1$ may produce needle position control data and fabric feed control data alternately. The combination of the memory $ROM_1$, key board KB, synchronizer SG and timing buffer $TB_1$ is disclosed in the copending U.S. patent application Ser. No. 715 691 which now is U.S. Pat. No. 4,086,862 issued May 2, 1978, and copending West German patent application P No. 26 26 322.9 of the same applicant.

$ALU_1$ is a first calculating device receiving stitch control signals from the memory $ROM_1$ and, which temporarily memorizes these stitch control data and compairs the two stitch control data, i.e., the preceded one and the next one each including needle and feed control signals, to calculate out the difference as a number of the moving steps of pulse motor. $ALU_2$ is a second calculating device receiving a number of moving steps from the first calculating device $ALU_1$ to set the intial address, the data read-out order and the number of read-out data of a second electronic memory $ROM_2$ which stores data for determining the time intervals of pulses, thus to control the time intervals of moving steps of pulse motor. In case the number of moving steps $R_1$ is above 3, the number of steps is divided into three modes $M_1$, $M_2$, $M_3$, or $M'_1$, $M'_2$, $M'_3$ as shown in FIG. 2, and the number of steps to be controlled in the first mode $M_1$ or $M'_1$ is determined to set the initial address of the second memory $ROM_2$ and simultaneously the initial set of variable $R_2$ is made to calculate out the number of steps. This is based on a calculating formula $R_2 = R_1/3 - 1$, and the odds as the result of division is cut away. The calculating device $ALU_2$ is operated to initially set the variable $R_2$ to 0 in case the number of steps is below 3 and when the result of calculation is 0 or minus.

Further the calculating device $ALU_2$ determines the number of steps to be controlled in the second mode $M_2$ or $M'_2$ and makes the initial set of variable $R_3$ to calculate out the number of steps. This is based on the calculating formula $R_3 = R_1 - 2(R_2 + 1)$. The calculating device $ALU_2$ is operated to set the variable $R_3$ to 0 in case the number of moving steps is below 3 and when the variable $R_2$ is 0 and therefore the variable $R_3$ is below 1. Further the calculating device $ALU_2$ determines the nubmer of steps to be controlled in the third mode $M_3$ or $M'_3$ and makes the initial set of variable $R_4$ to calculate out the number of steps. This is based on the calculating formula $R_4 = R_2 + 2$. In case the number of moving steps is below 3, the variable $R_4$ is maintained and the initial set of the steps $R_1$ is made.

$ALU_3$ is a third calculating device for calculating out the number of steps, for example, in modes $M_1$, $M_2$, $M_3$. The calculating device $ALU_3$ receives the initial set values of the second calculating device $ALU_2$ and cooperates with the timing buffer $TB_2$ and is operated in synchronism with the signals of a loop counter RC to progressively decrease the variable $R_2$ on the basis of the calculation formula $R_2 \leftarrow R_2 - 1$ so as to make a calculation in the first mode each time a stepping pulse is produced. When the variable $R_2$ becomes 0, the calculating device progressively decrease the variable $R_3$ on the basis of the calculation formula $R_3 \leftarrow R_3 - 1$ to make a calculation in the second mode. When the variable $R_3$ becomes 0, the calculating device progressively decrease the variable $R_4$ on the basis of the calculating formula $R_4 \leftarrow R_4 - 1$ to make a calculation in the third mode. When the variable $R_4$ becomes O, the calculating device finishes the calculation.

$ALU_4$ is a fourth calculating device receiving the output of the third calculating device $ALU_3$ to calculate out the addresses of memory $ROM_2$, and is reset each time the memory $ROM_1$ produces an output. In relation to the memorizing order of memory $ROM_2$, the calculating device $ALU_4$ has a reset value 2, and reads out a time interval data of pulses from the memory $ROM_2$ each time the variable $R_2$ is progressively decreased to control the data in a time decreasing direction. While the variable $R_3$ is progressively decreased, the calculating device $ALU_4$ fixes reading out of the time interval data of pulses. On the other hand, the calculating device controls the time interval data of pulses in a time increasing direction each time the variable $R_4$ is progressively decreased.

The memory $ROM_2$ stores the data as shown in the table of FIG. 6 in association with the addresses. These data are employed to determine a time interval of pulses as above mentioned, i.e., a time from generation of a stepping pulse to the next generation of the stepping pulse. In this embodiment, as will be described in detail hereinlater, each of the data is multiplied by $5 \times 10^{-6}$ second to determine a time interval (second). The aforementioned control of time interval decreasing direction is implemented by following down the addresses in FIG. 6. On the contrary, the time interval increasing control is implemented by following up the addresses.

The aforementioned loop counter RC (FIG. 3) receives the data of memory $ROM_2$ and modifies the data as will be mentioned, and then calculates the data with the speed $5 \times 10^{-6}$ second. Upon finishing the calculation, the loop counter RC gives a clock pulse to a timing buffer $TB_2$, so that the calculating device $ALU_3$ may implement a calculation. $ALU_5$ is a fifth calculating device receiving an output of calculating device $ALU_3$, and is operated in association with the loop counter RC to smoothen the inclinations from modes $M_1$, $M_3$ to modes $M'_1$, $M'_3$ respectively as the number of steps becomes smaller as shown in FIG. 2. Especially in a mode of many steps, the device ALU5 implements a calculation to modify the data so as to bring about an inclination of exponential function as shown by the broken lines in FIG. 2. Namely, the calculating device ALU3 starts to calculate the variable $R_2$ for controlling the first mode, and makes a calculation $R_5=R_0-R_1$ in which $R_5$ is a difference between a predetermined maximum number of steps $R_0$ and the number of moving steps $R_1$. Then the calculating device gives the value to the loop counter RC, and simultaneously progressively increases the variable $R_5$ by the formula $R_5 \leftarrow R_5+1$ each time the third mode control variable $R_4$ is progressively decreased and gives the value to the loop counter RC. The loop counter RC counts up the addition of the variable $R_5$ and the data of memory $ROM_2$ at a speed of $5\times10^{-6}$ second.

DIV is a distribution circuit which is operated to confirm the high level signal of synchronizer SG to drive a needle position control pulse motor $M_B$ each time the circuit DIV receives the count-up signal of loop counter RC. Similarly the distribution dircuit DIV confirms the low level signal of synchronizer SG to drive a feed control pulse motor $M_F$ through a drive device DV.

With the foregoing combination of components, the operation of the invention is as follows; in reference to the flow chart in FIG. 4, it is to be presumed that the pulse motors for controlling the needle position and the fabric feed are each driven in the maximum region of 60 steps. If a power source is applied, the control is started. The key board KB is selectively operated to designate the initial address of data stored in the memory $ROM_1$ for a selected pattern. The address of memory $ROM_1$ is advanced to designate, in this case, the first needle position control output for the first stitch. Then the timing signal of synchronizer SG is read out. If the timing signal is high level, a flag becomes 1 to drive the needle position control motor $M_B$ by way of the distributin circuit DIV. With respect to the needle position coordinate, the calculating device $ALU_1$ makes a calculation; a set number of moving steps $R_1$ = new coordinate date- —old coordinate data so as to compare a new data read out of the memory $ROM_1$ with the initial reset value, for example, 0 with respect to the initial stitch. It is to be assumed that a selected pattern causes the memory $ROM_1$ to designate 60 steps of the pulse motor from the left needle position at the reset value to the farthest right needle position so as to produce the initial stitch. Therefore $R_1=60$. With $R_1$ 3 the calculating device $ALU_2$ makes a calculation $R_2=R_1/3-1$ as the set number of steps $R_2$ in the first mode $M_1$ in FIG. 2, and obtains $R_2=19$. Then the calculating device $ALU_2$ makes a calculation; $R_3=R_1-2(R_2+1)$ as the set number of steps $R_3$ in the second mode $M_2$, and obtains $R_3=20$, and then makes a calculation; $R_4=R_2+2$ as the set number of steps $R_4$ in the third mode $M_3$ and obtains $R_4=21$.

Then the calculating device $ALU_5$ makes a calculation to seek a value $R_5$ which is to be added to and modify the data of memory $ROM_2$ in the routine of interception INT as will be mentioned. The calculation is based on the formula $R_5=R_0-R_1$ in which the maximum number of steps $R_0$ is 60, and $R_5=0$ is obtained. Then the calculating device $ALU_4$ designates the address 2 of the memory $ROM_2$ storing time interval control data as shown in FIG. 6. The addresses 1 and 2 are used only in the third mode $M_3$ to make the inclination more smooth than that of the first mode $M_1$. As the data read out from memory $ROM_1$ indicates no end of the pattern, the control passes to an interception routine. In the interception routine as shown in FIG. 5, since the flag is 1, the loop counter RC gives an order to the drive device DV to produce a first pulse to the needle position control motor $M_B$, and at the same time gives a clock pulse to the timing buffer $TB_2$. The first pulse is not due to the data of memory $ROM_2$ and has no meaning of time interval.

Since $R_2$ is not 0, the calculating device $ALU_3$ makes a calculation $R_2 \leftarrow R_2-1$ due to the action of the timing buffer $TB_2$ and makes the variable $R_2$ to 18. Then the calculating device $ALU_4$ advances the address of memory $ROM_2$ to 3 to read out thedata 119 therefrom. The loop counter RC calculates out the addition A of the data 119 and the previously obtained $R_5$, and sets the value 119 since $R_5$ is 0 and then starts a timer to return the control to the step immediately after the interception INT of main routine. In the other routine, a control is made, for example, to light the lamp of pattern selection, and waits until a pulse step is finished corresponding to one address of the memory $ROM_1$.

The loop counter RC counts up 119 with a speed of $5\times10^{-6}$ second, and then the timer is operated to start the interception routine. Thus the second pulse is given to the needle position control motor $M_B$. At the same time, a clock pulse is given to the timing buffer $TB_2$, and $R_2$ becomes 17. Then the address of memory $ROM_2$ is advanced to 4, and the loop counter RC counts up the data 104 to give the third pulse to the needle position control motor $M_B$ with a time interval shorter than that of the second pulse. The interception routine is repeated, and when $R_2$ becomes 1, the address of memory $ROM_2$ becomes 20. The loop counter RC counts up the data 49 to give nineteenth pulse to the needle position control motor. These 19 pulses are plotted in FIG. 5 forming, in the carve $R_1=60$, a property of the first mode $R_2=19$ to $R_2=1$. The coordinates of FIG. 5 are same with those of FIG. 2. As shown, a series of series of stepping pulses is speeded up in non-straight line at the initial part thereof. This is to lead the speed of the pulse motor by the speed of moving step pulses to increase the torque of motor which follows the speed of pulses.

When $R_2$ becomes 0 after production of the nineteenth pulse, the address of memory $ROM_2$ comes to 21. The loop counter RC counts up the data 48 to give the twentieth pulse to the needle position control motor $M_B$. The calculating device $ALU_3$ shifts from the calculation of $R_2$ to the calculation of $R_3$, and makes a calculation $R_3 \leftarrow R_3-1$. In the meantime, the calculating device $ALU_4$ fixes the addresses of memory $ROM_2$ and reads out the data therefrom each time the calculation is made. Thus from $R_3=20$ to $R_3=1$, the control of 20 pulses is made including the twentieth pulse as plotted in the second mode. When $R_3$ becomes 0 after production of twenty-nineth pulse, the thirtieth pulse is given with the data 48 of address 21.

Then the calculating device $ALU_3$ shifts from the calculation of $R_3$ to the calculation of $R_4$, and makes a calculation $R_4 \leftarrow R_4-1$. The address of memory $ROM_2$ is traced back by one and comes to address 20, and the data 49 is read out. At the same time, the calculating device $ALU_5$ makes a calculation $R_5 \leftarrow R_5+1$ and obtains $R_5=1$. Then the loop counter RC counts up $A=49+1$ to give the thirty-oneth pulse to the needle position control motor $M_B$. Similarly when $R_4$ becomes 1, the address of memory $ROM_2$ comes to 1, and the data is 179 while $R_2$ is 20. Therefore the loop counter RC counts up $A=179+20$ to give sixtieth pulse to the needle position control motor. When $R_4$ becomes 0, the control returns to the main routine. This means a completion of one address of pattern memory $ROM_1$. Then the calculating device $ALU_3$ is stopped until the signal level of synchronizer SG is changed. As shown in FIG. 5. 21 steps are plotted in the third mode from $R_4=21$ to $R_4=1$. This corresponds to the broken line in FIG. 2.

When the synchronizer SG produces a falling signal, the address of memory $ROM_1$ is advanced by one. As the read out data is a feed control data, the flag becomes 0. Thus in the same manner as above described, the feed control motor $M_F$ is driven. Upon completion of all stitch controls of a selected pattern, the timing buffer $TB_1$ is continuously operated to repeat the formation of the same pattern implementing the initial set of memory ROM on the basis of the final data of memory $ROM_1$ and the data of key board KB.

In FIG. 5, the cases $R_1=30$ and $R_1=3$ are illustrated. In the case of $R_1=30$, the set number of steps $R_2$ is 9 in the first mode, the set number of steps $R_3$ is 10 in the second mode, and the set number of steps $R_4$ is 11 in the third mode. The value $R_5$ added to and amending the data of memory $ROM_2$ is $R_5=R_0-R_1=30$. The second pulse $R_2=8$ is $A=119+30$. Therefore the loop counter RC counts up $119+30$, and requires much time than counting up 119 in the case of $R_1=60$. Thus the inclination property becomes milder. Further in the case of $R_1=30$, $R_5$ becomes 31 to produce the thirty-oneth pulse, and thus the formula is $A=63+31$ together with the data of memory $ROM_2$ while in this case of $R_1=60$, $A=49+1$ is to produce the forty-oneth pulse in the third mode, and therefore $R_1$ is 1.

The invention has been explained in relation to a sewing machine. It is however possible that the memory $ROM_1$ may alternately store the data for determining the shift amount of X, Y coordinates, which may be changed over therebetween by synchronizer SG, so as to control an X−Y plotter or NC machine tools.

Finally according to the invention, since the time interval data of memory $ROM_2$ are repeatedly used to obtain a control property of pulse motor in response to the changes of set number of steps $R_1$ from 60 to 1, for example, in this embodiment, the memory may store a small amount of data, and the effect is obtained that the speed of stepping pulses is mild at the time of acceleration and deceleration as the set number of pulses becomes smaller, and as a whole the control is smoothly implemented at a high speed. It will be understood that each of the elements described above, or two or more together, may also find a useful application in other types of driving systems for pulse motors differing from the types described above.

While the invention has been illustrated and described as embodied in a pulse motor driving system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A pulse motor driving system, comprising a memory storing data for controlling time intervals between the adjacent pulses produced in a series to steppingly drive a pulse motor; means for designating a number of stepping pulses in a section from start to stop of the pulse motor; calculating means dividing the designated number of stepping pulses into a predetermined number of parts, said calculating means controlling the read-out order of the time interval control data in each of the divided parts of pulses to thereby repeatedly use the data to control the time intervals between the pulses in these divided parts, said calculating means being operated in accordance with calculating formulas in the form of functions of the number of stepping pulses, each being specific to the divided parts of pulses so as to modify the data read out to control the pulses in these divided parts; and pulse generating means operated in response to the output data of the calculating means to determine the time intervals of the pulses; said calculating means being operated in accordance with the calculating formulas to progressively increase and decrease the speed of pulses in the divided parts, said calculating formulas including coefficients to modify the degrees of progressive increase and decrease of the pulse speed in response to the number of stepping pulses.

* * * * *